(12) United States Patent
Woulfe (10) Patent No.: US 11,157,272 B2
(45) Date of Patent: Oct. 26, 2021

(54) AUTOMATIC IDENTIFICATION OF APPROPRIATE CODE REVIEWERS USING MACHINE LEARNING

(71) Applicant: MICROSOFT TECHNOLOGY LICENSING, LLC., Redmond, WA (US)

(72) Inventor: Muiris Woulfe, Dublin (IE)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 16/391,300

(22) Filed: Apr. 23, 2019

(65) Prior Publication Data
US 2020/0341755 A1   Oct. 29, 2020

(51) Int. Cl.
G06F 8/77 (2018.01)
G06N 20/00 (2019.01)
G06F 8/41 (2018.01)

(52) U.S. Cl.
CPC .............. *G06F 8/77* (2013.01); *G06F 8/427* (2013.01); *G06N 20/00* (2019.01)

(58) Field of Classification Search
CPC ............ G06F 8/77; G06F 8/427; G06N 20/00
See application file for complete search history.

(56) References Cited

U.S. PATENT DOCUMENTS

2014/0196010 A1* 7/2014 Balachandran ........... G06F 8/70 717/124
2018/0276105 A1* 9/2018 Srinivasan ............. G06N 20/00
2018/0349789 A1* 12/2018 Chen ..................... G06F 16/285
2019/0121621 A1* 4/2019 Aggarwal ............... G06F 8/427
2019/0303140 A1* 10/2019 Kelly ................... G06K 9/6282

OTHER PUBLICATIONS

Alsulami, et al., "Source Authorship Attribution Using Long Short-Term Memory Based Networks", In Proceedings of The European Symposium on Research in Computer Security, Aug. 12, 2017, pp. 65-82.
"International Search Report and Written Opinion Issued in PCT Application No. PCT/US20/022876", dated Jun. 25, 2020, 12 Pages.
Rahman, et al., "CORRECT: Code Reviewer Recommendation at GitHub For Vendasta Technologies", In Proceedings of The 31st IEEE/ACM International Conference on Automated Software Engineering, Sep. 3, 2016, pp. 792-797.
Yu, et al., "Review Recommendation for Pull-Requests In GitHub: What Can We Learn From Code Review And Bug Assignment?", In The Journal of Information and Software Technology, vol. 74, Jan. 18, 2016, pp. 204-218.

* cited by examiner

Primary Examiner — Wei Y Zhen
Assistant Examiner — Amir Soltanzadeh (57) ABSTRACT

A deep learning model is trained on historical pull requests to automatically identify appropriate reviewers to review source code from one or more source code repositories. The model is trained on features that are based on past pull requests from the source code repositories and that represent the context of the syntactic representation of the changed code. The model learns patterns found in the changed source code and of the past peers associated with the changed source code to relate certain source code fragments with certain peers. The model generates probabilities based on the learned patterns which are used to identify appropriate reviewers more suitable to review the source code.

15 Claims, 6 Drawing Sheets

AUTOMATIC IDENTIFICATION OF APPROPRIATE CODE REVIEWERS USING MACHINE LEARNING

BACKGROUND

Peer or code review is a process that is often utilized during software development where the source code under development is reviewed by one or more peers of a developer. The source code is often inspected to discover errors, to ensure that the source code complies with best practice standards and to discover vulnerabilities, such as race conditions, malware, memory leaks, buffer overflows, format string exploits, and the like. Code review is used to find these problems which may have been overlooked in the development of the source code before the software is released.

There are different types of code reviews. Change-based code review is a review process that is based on the changes made to a source code file. A pull request is one such type of changed-based code review. A pull request is used in a distributed version control system to notify a maintainer of a source code program of changes made to the program. The pull request is reviewed by the maintainer and the change may be accepted or rejected. If the change is accepted, the change is merged into the source code program.

Often it is difficult to know who should participate in reviewing a source code program. Code review works best when the program is reviewed by those programmers having the best experience with the techniques or technologies used in the source code program. However, at times it may not be possible to know the best candidates with the requisite expertise to review a source code program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated process utilizes a deep learning model that learns, from past or historical pull requests, the best candidates to participate in a change-based code review. The deep learning model is trained on historical pull requests to automatically identify additional reviewers to review source code from a source code repository. The model is trained on features that are based on changes made to the source code from pull requests and features that are based on the individuals having reviewed, authored or developed the changes. The model learns patterns found in the pull request that relate certain source code fragments with certain individuals. The model generates probabilities based on the learned patterns which are used to identify peers more suitable to review source code from the source code repository.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a data-driven automatic technique for determining code-based code reviewers. The automatic technique utilizes a deep learning model that learns, from past or historical change-based code reviews, those code reviewers appropriate to review a source code program.

A pull request is a type of change-based code review. Pull requests are used in version control systems by teams and organizations to collaborate on the review of source code programs. In this collaborative setting, the peers share a single repository and topic branches are used to enhance the code with additional features and to isolate changes. The pull requests are used to notify project maintainers about the changes made to the source repository and to initiate a discussion about the changes before the changes are merged into the main branch though a commit.

The deep learning model uses features derived from the pull requests for a source code repository to learn patterns to associate a code segment with a peer more suitable to engage in peer review for the source code repository. The deep learning model uses code-based features such as the context of the syntactic representation of the changed code and peer-based features to discover relationships between a code segment and a peer. The peers most involved in the subject area under review are identified to participate in the review thereby having the better skills to discover error and flaws in the source code repository.

Deep learning is a set of techniques for training neural networks. Deep learning is a subset of machine learning which uses a cascade of layers for feature extraction and transformation. Deep learning refers to the multiple layers by which the training data is processed and transformed into the output. Deep learning differs from machine learning techniques such as linear regression, K-means, decision trees, random forest, support vector machines, naive Bayes classifiers, boosted classification trees, and nearest neighbor classifiers Deep learning models include artificial neutral networks (ANNs), recurrent neural networks (RNNs), deep belief networks, long short term memory (LSTM) networks, and deep Boltzmann machines.

It should be noted that the term "developer" pertains to the individual that authored or contributed to the original source code fragment. The term "reviewer" pertains to the individual that reviews the pull request. The term "peer" refers to both developers and reviewers.

Attention now turns to a further discussion of the system, devices, components, and methods utilized in the machine learning-based code reviewer suggestion system.

System

Figure 1:
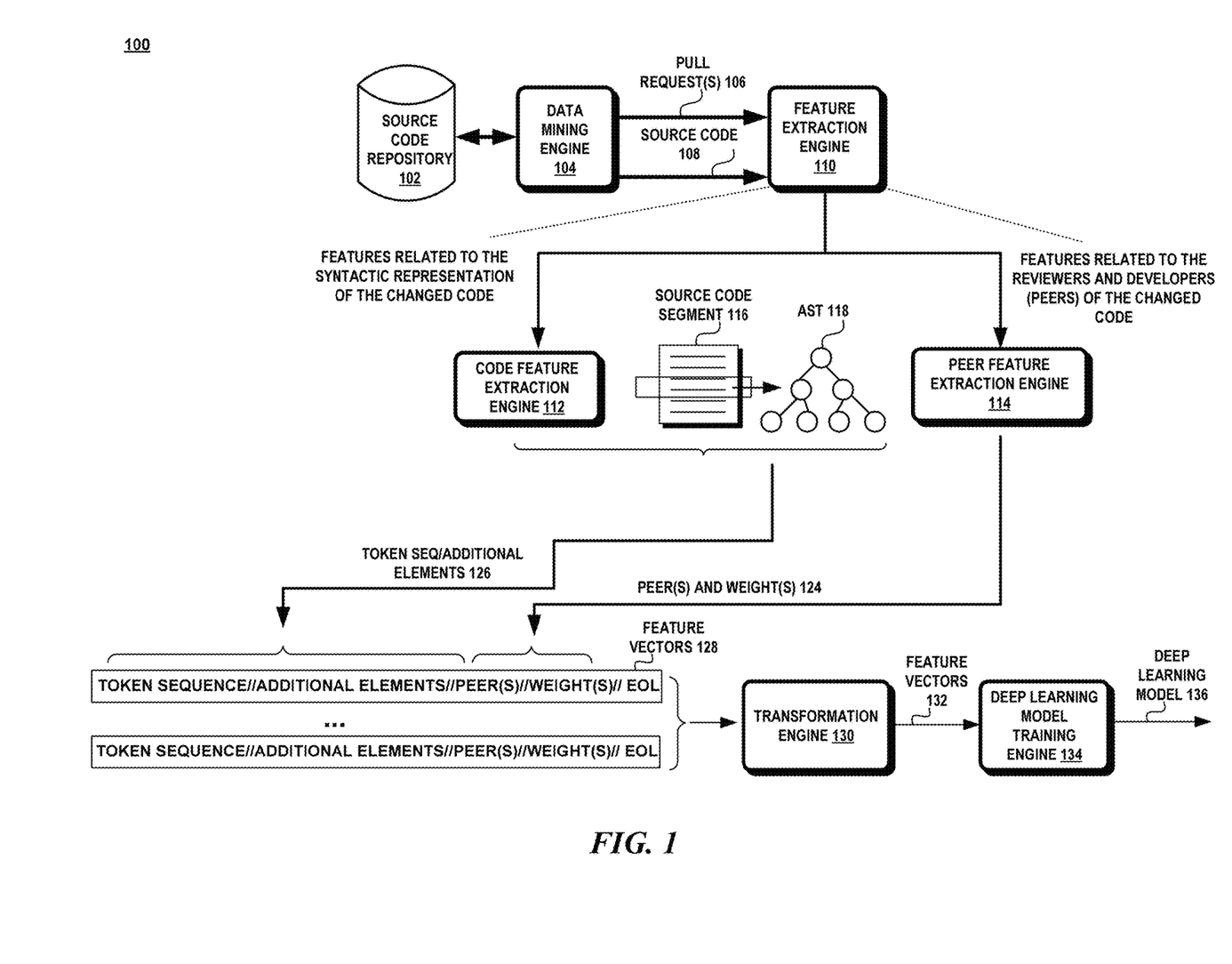
FIG. 1 is a schematic diagram illustrating an exemplary configuration of a training system that trains a deep learning model to identify additional peers to perform code review.

FIG. 1 illustrates a block diagram of an exemplary training system 100 in which various aspects of the invention may be practiced. As shown in FIG. 1, training system 100 trains a deep learning model 136 to identify appropriate peers to engage in a code review of a source code repository. The training system 100 includes a source code repository 102, a data mining engine 104, a feature extraction engine 110, a transformation engine 130, and a deep learning model training engine 134.

The source code repository 102 is part of a source control system or version control system implemented as a file archive and optionally a web hosting facility that stores large amounts of artifacts, such as source code files. Programmers (i.e., developers, users, end users, etc.) often utilize a shared source code repository to store source code and other programming artifacts that can be shared among different programmers. A programming artifact is a file that is produced from a programming activity, such as source code, program configuration data, documentation, and the like. The source control system or version control system stores each version of an artifact, such as a source code file, and tracks the changes or differences between the different versions. Repositories managed by source control systems may be distributed so that each user of the repository has a working copy of the repository. The source control system coordinates the distribution of the changes made to the contents of the repository to the different users.

In one aspect, the version control system is implemented as a cloud or web service that is accessible to various programmers through online transactions over a network. An online transaction or transaction is an individual, indivisible operation performed between two networked machines. A programmer may check out an artifact, such as a source code file, and edit a copy of the file in its local machine. When the user is finished with editing the source code file, the user performs a commit which checks in the modified version of the source code file back into the shared source code repository. A pull request informs others that changes have been made to one or more files which were pushed or committed back into the repository.

A source code repository 102 may be privately accessible or publicly accessible. There are various types of version control systems, such as without limitation, Git, and then platforms hosting version control systems such as Bitbucket, CloudForge, ProjectLocker, GitHub, SourceForge, Launchpad, Azure DevOps.

The data mining engine 104 extracts each pull request 106 associated with a particular source code repository 102 and the source code subject to the pull request 108. The repository 102 may be associated with an organization, project, group or individual. The pull request 106 and the source code 108 are then analyzed by the feature extraction engine 110 to obtain features to train the deep learning model 136.

The feature extraction engine 110 is composed of a code feature extraction engine 112 and a peer feature extraction engine 114. The code feature extraction engine 112 generates features related to the syntactic representation of the context of the changed code. The code feature extraction engine 112 generates an abstract syntax tree (AST) 118 representing the context of the changed code and formats this context into a token sequence 126. The context includes the changed code and several lines of source code preceding and succeeding the changed code. The code feature extraction engine 112 also obtains the method, class, interface and/or namespace of the changed code which is referred to as the additional elements and input into a feature vector as well. In addition, any methods invoked along with the class, interface and/or namespace in which those invoked methods reside may also be added to the additional elements and input into a feature vector.

The peer feature extraction engine 114 generates features related to the developer of the source code and the reviewers of the changed code. The peer feature extraction engine 114 discovers through the pull requests 106 the identity of the reviewers and developers. A weight is associated with each reviewer and developer based on a number of factors. The weight is used to set an importance to a reviewer and developer. The identity of the developer/reviewer and the corresponding weight 124 is then added to the feature vector.

The feature vectors 128 are then transformed into integer representations 132 by a transformation engine 130 and then input to the deep learning model training engine 134. The deep learning model training engine 134 trains an LSTM. An LSTM is a type of recurrent neural network capable of learning order dependence in sequential patterns using a gradient-based learning algorithm. The LSTMs are trained iteratively, making multiple passes over the training dataset before converging to a minimum Each training iteration includes forward propagation, loss calculation, backpropagation steps followed by updating the weights.

In general, the LSTM architecture includes an input layer, one or more hidden layers in the middle with recurrent connections between the hidden layers at different times, and an output layer. Each layer represents a set of nodes and the layers are connected with weights. The input layer $x_t$ represents an index at temporal position t and the output layer $y_t$ produces a probability distribution that the token at position t is likely to be the most suitable candidate for peer review. The hidden layers $h_t$ maintain a representation of the history of the training data. Gating units are used to modulate the input, output, and hidden-to-hidden transitions in order to keep track of a longer history of the training data. The output of the LSTM is a probability for each peer indicating whether or not the peer is a suitable code reviewer.

Figure 2:
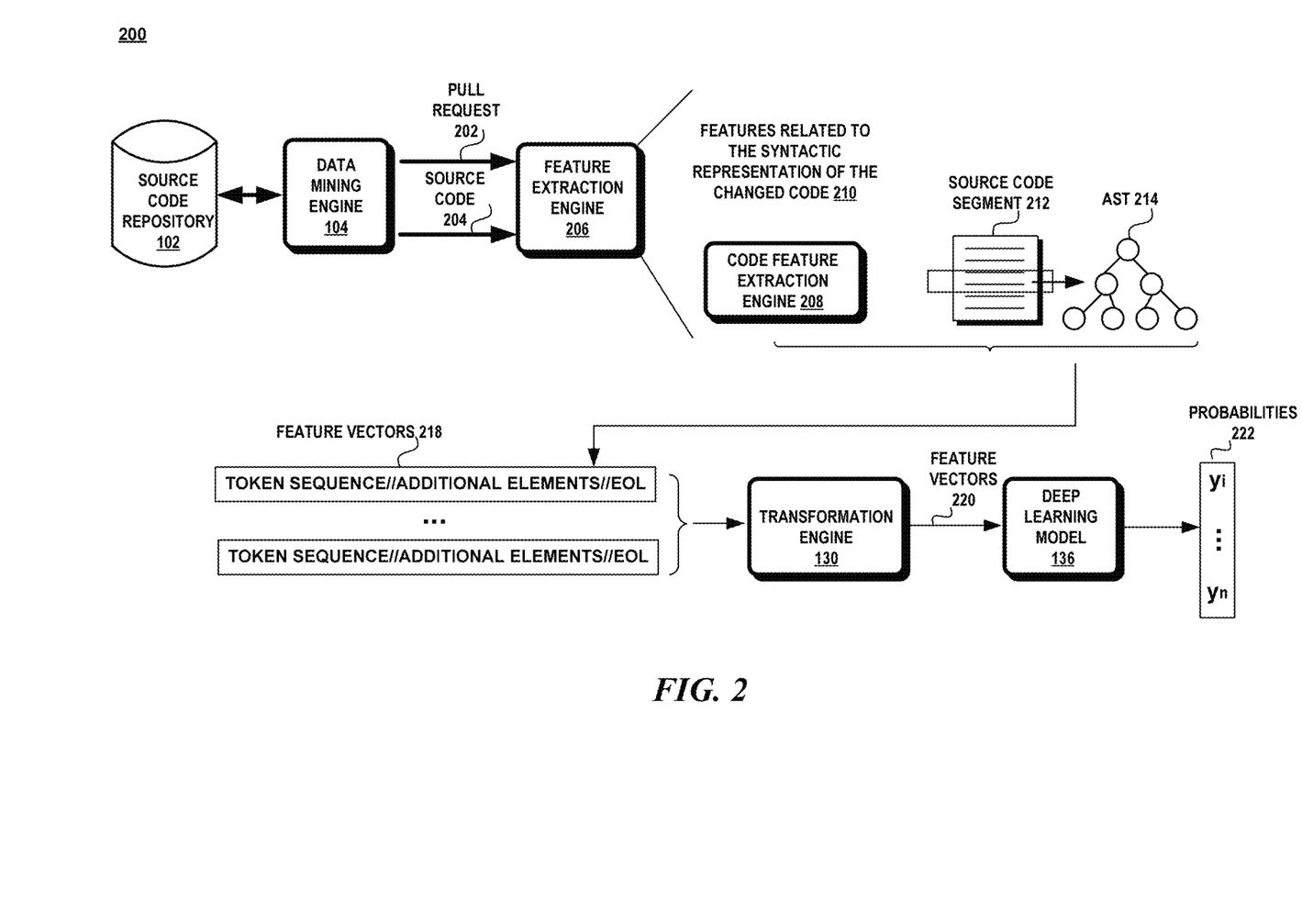
FIG. 2 is a schematic diagram illustrating an exemplary configuration of a prediction system utilizing the deep learning model identify appropriate peers to perform code review.

FIG. 2 illustrates the components of a prediction system 200 that utilizes the deep learning model 136 to provide recommendations of candidates for peer review. The prediction system 200 includes a source code repository 102, a data mining engine 104, a feature extraction engine 206 that includes a code extraction engine 208, feature vectors 218, a transformation engine 130, and the deep learning model 136.

When a new pull request is submitted or when the user manually invokes an action to submit the pull request, the data mining engine 104 scans the pull request 202 from a particular source code repository 102 and the source code 204 associated with the pull request. The feature extraction engine 206 uses a code extraction engine 208 to analyze the pull request and to generate feature vectors representing the syntactic context of the changed code. The transformation engine 130 converts the text-based feature vectors 218 into integer values 220 which are input into the deep learning model 136. The deep learning model 136 outputs a probability 222 for each peer, $y_i$. The probabilities 222 are ranked and the recommended peers are associated with the top k probabilities.

The data mining engine 104, feature extraction engines 110, 206, code feature extraction engines 112, 208, peer feature extraction engine 114, transformation engine 130, and deep learning model training engine 134 may be a sequence of computer program instructions, that when executed by a processor, causes the processor to perform methods and/or operations in accordance with a prescribed task. These engines may be implemented as program code, programs, procedures, modules, components, code segments, program stacks, middleware, firmware, methods, routines, and so on. These engines may be implemented according to a predefined computer language, manner or syntax, for instructing a computer to perform a certain function. The instructions may be implemented using any suitable high-level, low-level, object-oriented, visual, assembly language, machine code, compiled and/or interpreted programming language.

The various aspects of systems 100 and 200 may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates, and any combination thereof. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an aspect is implemented using hardware elements and/or software elements may vary in accordance with any number of factors, such as desired computational rate, power levels, bandwidth, computing time, load balance, memory resources, data bus speeds and other design or performance constraints, as desired for a given implementation.

It should be noted that FIGS. 1 and 2 shows components of a system in one aspect of an environment in which various aspects of the invention may be practiced. However, the exact configuration of the components shown in FIGS. 1 and 2 may not be required to practice the various aspects and variations in the configuration shown in FIGS. 1 and 2 and the type of components may be made without departing from the spirit or scope of the invention.

Methods

Attention now turns to a description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
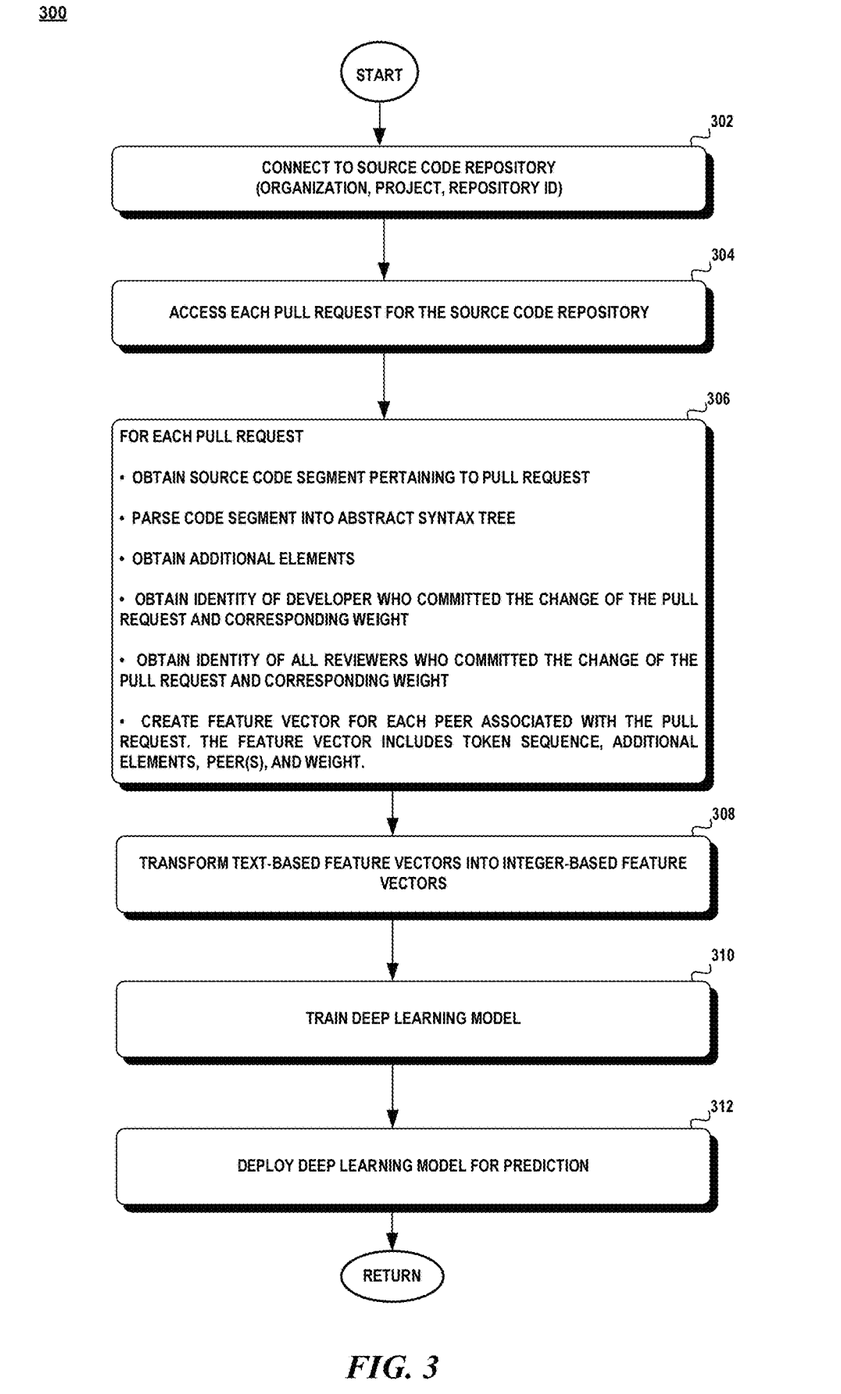
FIG. 3 is a flow diagram illustrating an exemplary method for training the deep learning model.

FIG. 3 is a flow chart illustrating an exemplary method 300 for training a deep learning model to automatically recommend candidates for peer code review. Referring to FIGS. 1 and 3, the data mining engine 104 connects to a source code repository 102. The source code repository 102 may belong to a particular organization, project, or developer (block 302).

The data mining engine 104 accesses certain pull requests 106 of the source code repository 102. In some cases, some pull requests may be skipped if they are very old or pertain to a few lines of code changes. The skipped pull requests are eliminated based on the target objective. (Collectively, block 304).

The feature extraction engine 110 analyzes the pull request and obtains the source code 108 subject to the pull request and optionally, its surrounding code. The code feature extraction engine 112 parses a segment of the source code which includes the changed lines of the source code in the pull request and a pre-configured number of lines before and after the changed lines. The code segment not only represents the changed source code but also the context of the changed source code which is useful in detecting coding patterns. This code segment enables the LSTM to detect coding patterns indicative of a skill that can be attributed to a particular peer. (Collectively, block 306)

The code segment is parsed into an abstract syntax tree. An abstract syntax tree represents the syntactic structure of the program in a hierarchical or tree structure. The abstract syntax tree is an n-ary tree data structure that includes nodes that represent a construct in the grammar of the programming language of a program. The abstract syntax tree includes one root node, multiple internal nodes, and multiple leaf nodes. The internal nodes are labeled by operators and the leaf nodes represent the operands of the operators. A leaf node contains a token representing the operand of an operator and an internal node includes a token representing the operator. A token is a symbol that represents an operand and an operator. (Collectively, block 306).

The abstract syntax tree is traversed in a depth first order to generate a sequence of tokens that represent the syntactic structure of the context of the changed code. The method, class, interface and/or namespace of the changed code is also input into the feature vector to train the deep learning model. In addition, any methods invoked along with the class, interface and/or namespace in which those invoked methods reside are input into the feature vector as well. These additional elements that are related to the code segment may be obtained through a semantic API. A semantic model is a set of semantic APIs that have the capability to obtain information about the semantics or meaning of a program. The semantic APIs may be a feature or extension found in a compilation component (e.g., Microsoft's Roslyn compiler). In one aspect, the code feature extraction component 112 contains a compilation component having the capability to parse the code segment into an abstract syntax tree and to utilize a semantic API to obtain the additional elements associated with the code segment. The token sequence and the additional elements are output into a feature vector 128. (Collectively, block 306).

The peer feature extraction engine 114 obtains the identity (e.g., email address, user name, code name) of all the reviewers associated with the pull request and the developers (i.e., authors) of the changed code, collectively peers. A weight is associated with each peer that is used to bias the probabilities that the LSTM generates. The weights can be configured differently for different scenarios. For instance, different version control system hosting platforms have different sign off states, so different weighting may be appropriate in those cases. The value of a weight may be tied to information such as the number of comments left by a reviewer or the ultimate status of their comments. (Collectively, block 306).

A feature vector 128 is generated for each reviewer having reviewed the changed code in the pull request and for the developers that authored the code segment that was changed or signed off on the pull request (block 306). Alternatively, a single feature vector may be used that includes each reviewer and developer and their respective weight up to a threshold number.

The process noted above can be implemented using Azure DevOps Services REST APIs which provide capabilities to work with GIT repositories. For instance, the Get Pull Requests API returns a commit identifier which can be used in a subsequent API to get the actual source code. However, it should be noted that the techniques described herein are not limited to these services and that other services may be used as well.

The feature vectors 128 are then transformed into integer-value feature vectors by the transformation engine 130 (block 308) and input into the deep learning model training engine 134 which generates a deep learning model 136 as described above (block 310). The deep learning model is then deployed for use in a prediction system (block 312).

Figure 4:
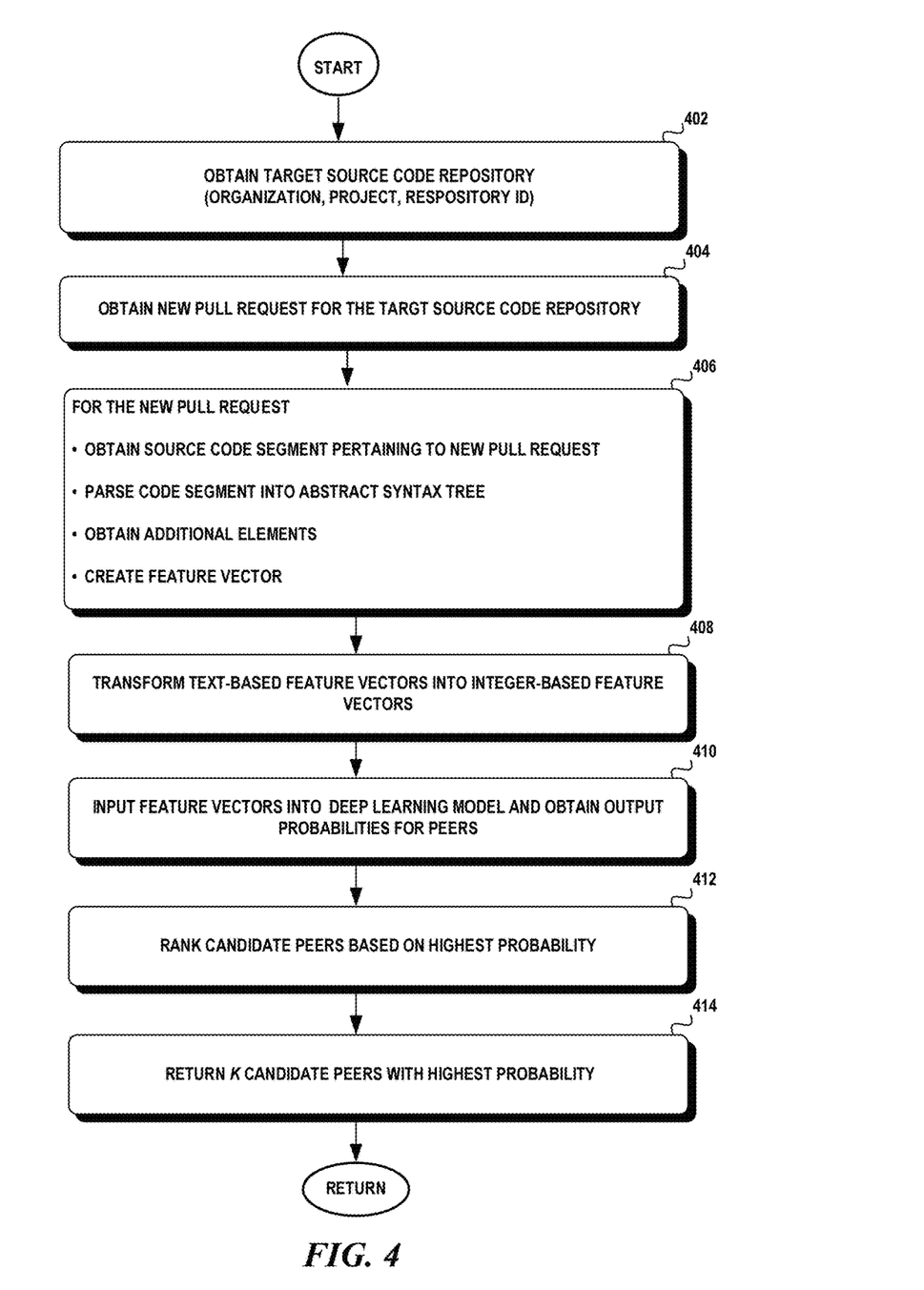
FIG. 4 is a flow diagram illustrating an exemplary method for using the deep learning model.

FIG. 4 is a flow chart illustrating an exemplary method 400 for automatically recommending additional reviewers using the deep learning model. Referring to FIGS. 2 and 4, a target source code repository 102 which can be from an organization, project, group or individual and identified by a repository id (block 402). The data mining engine 104 obtains a new pull request 202 for this source code repository (block 404).

The data mining engine 104 extracts the source code subject to the new pull request for the feature extraction engine 206. The code feature extraction engine 208 parses a code segment containing the changed code and its surrounding context into an abstract syntax tree 214. The code feature extraction engine 208 obtains the additional elements associated with the code segment and adds the additional elements into the feature vector. A feature vector 218 is created for the new pull request including the token sequence extracted from the AST and the additional elements. (Collectively, block 406).

The transformation engine 130 transforms the text-based feature vectors 218 into integer-value feature vectors 220 (block 408) which are input into the deep learning model 136 (block 410). The deep learning model 136 outputs a probability for the set of peers that were part of the training dataset (block 410). The probabilities 222 are ranked from the highest probability to the lowest probability. The peers associated with the top k highest probabilities is selected to output or return, where k is a pre-configured number (block 414). One or more of the k reviewers/developers may be chosen to engage in the peer review (block 414).

Exemplary Operating Environment

Figure 5:
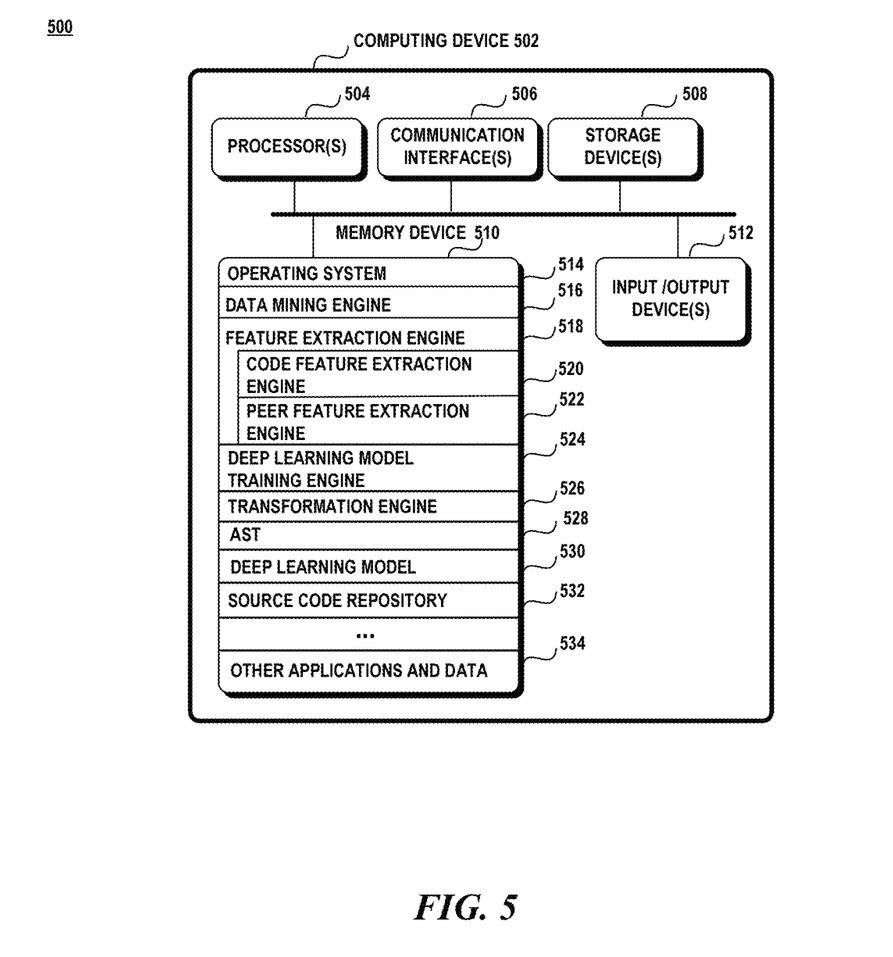
FIG. 5 is a block diagram illustrating a first exemplary operating environment.

Attention now turns to a discussion of a first exemplary operating environment. FIG. 5 illustrates a first exemplary operating environment 500 that includes at least one computing device 502. The computing device 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or any combination thereof. The operating environment 500 may be configured in a network environment, a distributed environment, a multi-processor environment, or a stand-alone computing device having access to remote or local storage devices.

A computing device 502 may include one or more processors 504, one or more communication interfaces 506, one or more storage devices 508, one or more input and output devices 512, and at least one memory device 510. A processor 504 may be any commercially available or customized processor and may include dual microprocessors and multi-processor architectures. The communication interface 506 facilitates wired or wireless communications between the computing device 502 and other devices. A storage device 508 may be a computer-readable medium that does not contain propagating signals, such as modulated data signals transmitted through a carrier wave. Examples of a storage device 508 include without limitation RAM, ROM, EEPROM, flash memory or other memory technology, CD-ROM, digital versatile disks (DVDs), or other optical storage, magnetic cassettes, magnetic tape, magnetic disk storage, all of which do not contain propagating signals, such as modulated data signals transmitted through a carrier wave. There may be multiple storage devices 508 in the computing device 502. The input/output devices 512 may include a keyboard, mouse, pen, voice input device, touch input device, display, speakers, printers, etc., and any combination thereof.

The memory device 510 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 510 may also include one or more external storage devices or remotely located storage devices that do not pertain to propagated signals, such as modulated data signals transmitted through a carrier wave.

The memory device 510 may contain instructions, components, and data. A component is a software program that performs a specific function and is otherwise known as a module, program, engine, and/or application. The memory device 510 may include an operating system 514, a data mining engine 516, a feature extraction engine 518 including a code feature extraction engine 520 and a reviewer/developer feature extraction engine 522, deep learning model training engine 524, transformation engine 526, AST 528, a deep learning model 530, a source code repository 532, and other applications and data 534.

Figure 6:
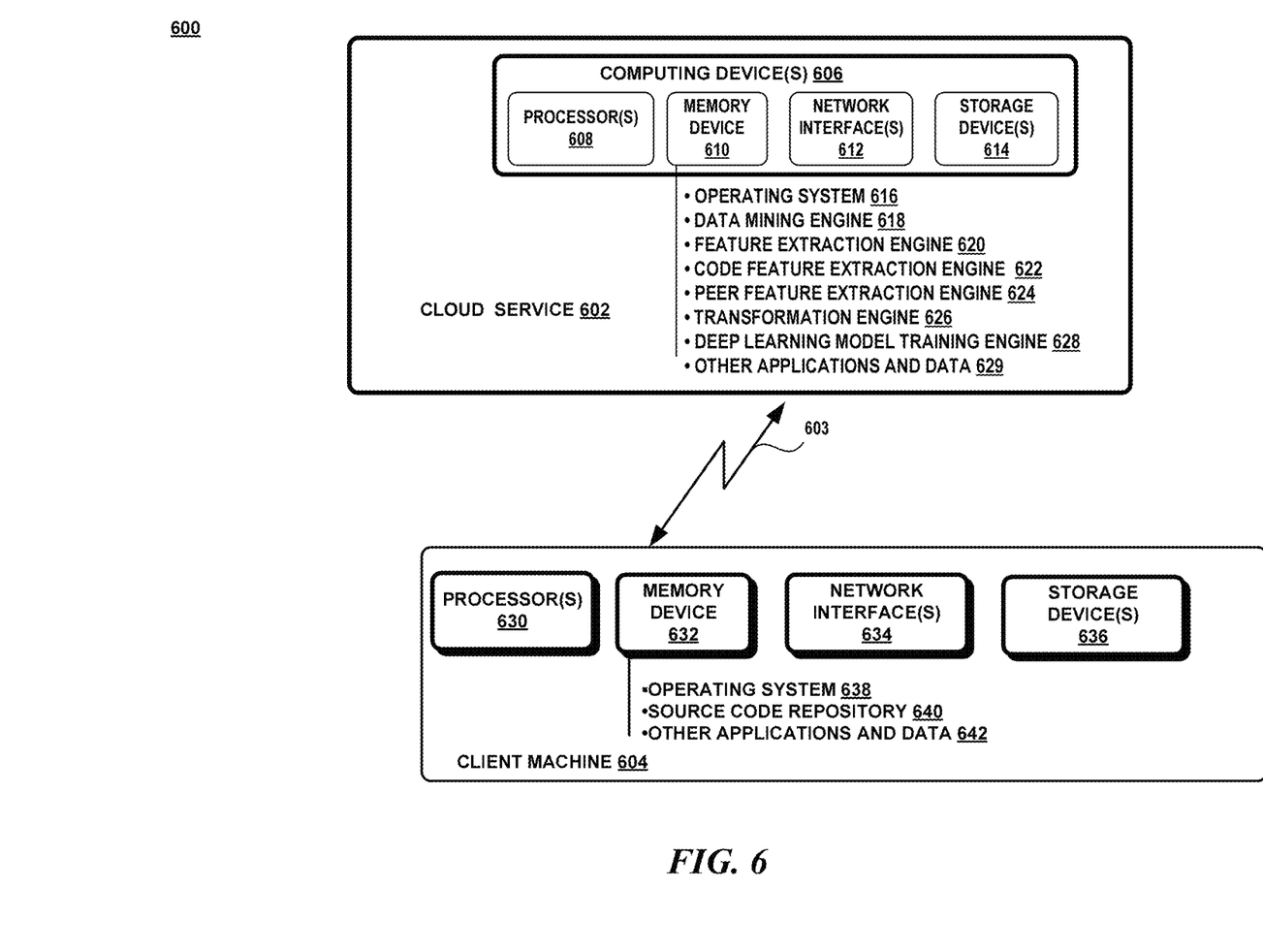
FIG. 6 is a block diagram illustrating a second exemplary operating environment.

FIG. 6 illustrates a second exemplary operating environment 600 that includes a cloud service 602 connected via a network 603 to a client machine 604. The cloud service 602 trains the deep learning model and provides the recommendations for a user of the cloud service.

The cloud service 602 may include one or more computing devices 606. The computing device 606 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or any combination thereof. The operating environment 600 may be configured in a network environment, a distributed environment, a multi-processor environment, or a stand-alone computing device having access to remote or local storage devices.

A computing device 606 may include one or more processors 608, at least one memory device 610, one or more network interfaces 612 and one or more storage devices 614 as described above. The memory device 610 may contain instructions, components, and data. A component is a software program that performs a specific function and is otherwise known as a module, program, engine, and/or application. The memory device 610 may include an operating system 616, a data mining engine 618, a feature extraction engine 620 including a code feature extraction engine 622 and a peer feature extraction engine 624, a transformation engine 626, a deep learning model training engine 628, and other applications and data 629.

The network 603 facilitates communications between the cloud service 602 and the client machine 604. The network 603 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

The client machine 604 is a computing device as described above. The client machine 604 may include one or more processors 630, at least one memory device 632, one or more network interfaces 634 and one or more storage devices 636 as described above. The client machine 604 may be utilized by developers or users who subscribe to the cloud service 602 to obtain code reviews for source code. The memory device 632 may include an operating system 638, a source code repository 640, and other applications and data 642.

CONCLUSION

A system is disclosed having one or more processors and at least one memory device. The system has one or more modules that are configured to be executed by the one or more processors to perform actions that: analyze at least one pull request from a source code repository to extract code-related features and peer-related features to form a training dataset, a code-related feature including a syntactic representation of a code segment associated with the at least one pull request, the peer-related features including an identifier associated with a peer associated with the at least one pull request; and generate a deep learning model trained from the training dataset to generate associated probabilities associated with one or more peers likely to participate in a code review of the source code repository. In one aspect, the deep learning model is a long short term memory network (LSTM).

The one or more modules perform additional actions that: generate an abstract syntax tree (AST) from a code segment related to the at least one pull request, the code segment including at least one source code line preceding a changed source code text and at least one source code line succeeding the changed source code text; and traverse the AST to generate a token sequence input into a feature vector. Additionally, the one or more modules perform additional actions that: obtain additional elements associated with the code segment, the additional elements including one or more of a method, interface, class, or namespace; and input the additional elements into the feature vector.

Further actions performed by the one or more modules perform additional actions are: obtain methods invoked within the code segment; and add the class, interface, and/or namespace of the invoked methods as part of the additional elements. The one or more modules perform additional actions that: identify at least one peer associated with the pull request; and associate a weight with the at least one peer. The one or more modules perform additional actions that: format a feature vector including the token sequence, additional elements, at least one peer and weight for the at least one peer; and train the deep learning model with the feature vector.

A method is disclosed comprising: detecting, at a computing device having at least one processor coupled to at least one memory device, a new pull request added to a source code repository, the new pull request associated with changed code; extracting features from the new pull request, the features including a syntactic representation of the changed code; inputting the extracted features into a deep learning model trained to predict one or more peers best suited to review the new pull request; obtaining one or more peers from the deep learning model; and utilizing at least one of the one or more peers to perform code review.

The method further comprises extracting additional elements related to the changed code, the additional elements including a method, class, interface and/or namespace associated with the changed code; and inputting the additional elements into the deep learning model. The method further comprises extracting a method invoked within a code segment associated with the changed code; and inputting the method invoked into the deep learning model. The syntactic representation of the changed code includes a token sequence representing a code fragment of the changed code, the code fragment including a number of lines of source code before the changed code and/or a number of lines of source code after the changed code. The deep learning model is a long short term memory (LSTM). The deep learning model generates a probability for each of a plurality of peers. The plurality of peers includes one or more of developers and/or reviewers having authored, developed or reviewed the changed code.

A device is disclosed comprising at least one processor and at least one memory. The at least one processor configured to: train a deep learning model to learn patterns found in changed source code to associate the patterns with one or more peers, a peer associated with the changed source code as a developer and/or reviewer, the deep learning model learns the patterns from past pull requests of a source code repository; and utilize the deep learning model to recommend at least one peer to review a new pull request. The at least one processor is further configured to: extract features from the past pull requests that represent a context of a syntactic representation of the changed source code to train the deep learning model.

The features from the past pull requests represent a context of a syntactic representation of the changed source code includes a code fragment encompassing the changed source code, wherein the code fragment includes source code lines before and after the changed source code. The features further include a method, class, interface, and/or namespace in the changed code and a method invoked in the class. The at least one processor is further configured to: extract features from the past pull requests that represent a developer and/or reviewer associated with the changed source code. The deep learning model is a long short term memory model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:

one or more processors and at least one memory device;

wherein the at least one memory device includes one or more modules, wherein the one or more modules are configured to be executed by the one or more processors to perform actions that:

analyze a plurality of pull requests from a source code repository to produce a training dataset, a pull request identifying changed code and a peer associated with the changed code;

extract code-related features from source code of the changed code, a code-related feature including a syntactic representation of a context of the changed code, the context including the changed code and source code surrounding the changed code;

extract peer-related features from the plurality of pull requests, a peer-related feature including one or more peers associated with the changed code;

form the training dataset to include the code-related features and the peer-related features; and train a deep learning model from the training dataset to learn patterns in the training dataset that relate to a select peer, the deep learning model constructed to output a probability representing a likelihood of a particular peer to participate in a code review of a target source code change of a new pull request from the source code repository.

2. The system of claim 1, wherein the deep learning model is a long short term memory network (LSTM).

3. The system of claim 1, wherein the one or more modules perform additional actions that:

generate an abstract syntax tree (AST) from a code segment related to a pull request, the code segment including at least one source code line preceding the changed code and at least one source code line succeeding the changed code; and traverse the AST to generate a token sequence input into the deep learning model.

4. The system of claim 3, wherein the one or more modules perform additional actions that:

obtain additional elements associated with the code segment, the additional elements including one or more of a method, interface, class, or namespace; and input the additional elements into the training dataset.

5. The system of claim 4, wherein the one or more modules perform additional actions that:

associate a weight with the one or more peers; and wherein the peer-related feature includes the weight.

6. The system of claim 5, wherein the one or more modules perform additional actions that:

format a feature vector including the token sequence, additional elements, the one or more peers and the weight of the one or more peers; and train the deep learning model with the feature vector.

7. A method, comprising:

detecting, at a computing device having at least one processor coupled to at least one memory device, a new pull request added to a source code repository, the new pull request identifying changed code;

extracting code-related features from source code of the changed code, a code-related feature including a syntactic representation of a context of the changed code and source code surrounding the changed code;

inputting the extracted code-related features into a deep learning model to obtain probabilities of peers likely to participate in a code review of the changed code, wherein the deep learning model is trained from a training dataset to learn patterns in the training dataset that relate to a select peer, wherein the training dataset includes code-related features and peer-related features;

obtaining one or more peers to review the new pull request from the deep learning model based on the probabilities; and utilising at least one of the one or more peers obtained from the deep learning model to perform code review.

8. The method of claim 7, further comprising:

extracting additional elements related to the changed code, the additional elements including a method, class, interface and/or namespace associated with the changed code; and inputting the additional elements into the deep learning model.

9. The method of claim 7, wherein the deep learning model is a long short term memory (LSTM).

10. The method of claim 7, wherein a peer includes one or more of developers and/or reviewers having authored, developed or reviewed the changed code.

11. A device, comprising:

at least one processor and at least one memory;

the at least one processor configured to:

analyze a plurality of past pull requests from a source code repository to produce a training dataset of feature vectors, a past pull request identifying changed code and a peer associated with the changed code;

extract code-related features from source code of the changed code, a code-related feature including the changed code and lines of source code surrounding the changed code;

extract a peer-related feature from a past pull request, the peer-related feature including a peer associated with the changed code;

form the training dataset to include feature vectors, a feature vector including a code-related feature and a peer-related feature of a pull request;

train a deep learning model to learn patterns found in the feature vectors to associate with one or more peers; and utilize the deep learning model to generate probabilities of the one or more peers extracted from the past pull requests having a likelihood to review a new pull request.

12. The device of claim 11, wherein the at least one processor is further configured to:

extract features from the past pull requests that represent a context of a syntactic representation of the changed source code to train the deep learning model.

13. The device of claim 11, wherein the feature vectors include a method, class, interface, and/or namespace of the changed code.

14. The device of claim 11, wherein the at least one processor is further configured to:

extract features from the past pull requests that represent a developer and/or reviewer associated with the changed source code.

15. The device of claim 11, wherein the deep learning model is a long short term memory model.

* * * * *